United States Patent
Nakahara

(10) Patent No.: US 11,408,630 B2
(45) Date of Patent: Aug. 9, 2022

(54) MANAGEMENT SYSTEM FOR BULDING EQUIPMENT

(71) Applicant: DAIKIN INDUSTRIES, LTD., Osaka (JP)

(72) Inventor: Takayuki Nakahara, Osaka (JP)

(73) Assignee: Daikin Industries, Ltd., Osaka (JP)

(*) Notice: Subject to any disclaimer, the term of this patent is extended or adjusted under 35 U.S.C. 154(b) by 176 days.

(21) Appl. No.: 16/759,229

(22) PCT Filed: Oct. 31, 2018

(86) PCT No.: PCT/JP2018/040580
§ 371 (c)(1),
(2) Date: Apr. 24, 2020

(87) PCT Pub. No.: WO2019/088198
PCT Pub. Date: May 9, 2019

(65) Prior Publication Data
US 2020/0333035 A1 Oct. 22, 2020

(30) Foreign Application Priority Data
Nov. 1, 2017 (JP) .............................. JP2017-211997

(51) Int. Cl.
*F24F 11/70* (2018.01)
*F24F 5/00* (2006.01)
(Continued)

(52) U.S. Cl.
CPC ................ *F24F 11/70* (2018.01); *F24F 5/00* (2013.01); *F25B 49/02* (2013.01); *G08B 29/26* (2013.01); *H04Q 9/00* (2013.01)

(58) Field of Classification Search
CPC .. F24F 11/70; F24F 5/00; F25B 49/02; G08B 29/26; H04Q 9/00
See application file for complete search history.

(56) References Cited

U.S. PATENT DOCUMENTS

| 2007/0069850 A1* | 3/2007 | Anderson | G05B 15/02 340/3.51 |
| 2016/0146495 A1* | 5/2016 | Malve | G05B 15/02 700/276 |
| 2016/0245570 A1* | 8/2016 | Han | F25B 49/02 |

FOREIGN PATENT DOCUMENTS

| JP | 600-120124 A | 6/1985 |
| JP | 2002-372288 A | 12/2002 |

(Continued)

OTHER PUBLICATIONS

International Preliminary Report of corresponding PCT Application No. PCT/JP2018/040580 dated May 14, 2020.
(Continued)

*Primary Examiner* — Henry T Crenshaw
(74) *Attorney, Agent, or Firm* — Global IP Counselors, LLP

(57) ABSTRACT

A management system for building equipment includes several units. An instruction transmission unit transmits an instruction to at least one device. A response reception unit receives a response indicating that a state transition is made by the device in accordance with the instruction. A detection unit detects an abnormal condition in which the response is not received by the reception unit within a reference time period after transmission of the instruction. A storage unit stores the reference time period. A time measurement unit measures a length of time from when the instruction is transmitted to when the response is received. A mode setting unit sets an operating mode of the management system to a reference-time-period calculation mode. A calculation unit performs calculations to determine the reference time period based on a measurement result obtained by the measurement unit, and prompts the storage unit to store the determined reference time period.

20 Claims, 5 Drawing Sheets

(51) Int. Cl.
    *F25B 49/02*      (2006.01)
    *G08B 29/26*      (2006.01)
    *H04Q 9/00*       (2006.01)

(56)         References Cited

FOREIGN PATENT DOCUMENTS

JP      2003-348671 A      12/2003
JP       2016-82348 A       5/2016
JP      2016-127495 A       7/2016
WO     2016/110904 A1       7/2016

OTHER PUBLICATIONS

European Search Report of corresponding EP Application No. 18 874 433.8 dated Jul. 6, 2021.
International Search Report of corresponding PCT Application No. PCT/JP2018/040580 dated Jan. 22, 2019.

\* cited by examiner

MANAGEMENT SYSTEM FOR BULDING EQUIPMENT

CROSS-REFERENCE TO RELATED APPLICATIONS

This U.S. National stage application claims priority under 35 U.S.C. § 119(a) to Japanese Patent Application No. 2017-211997, filed in Japan on Nov. 1, 2017, the entire contents of which are hereby incorporated herein by reference.

BACKGROUND

Field of the Invention

The present disclosure relates to a management system for building equipment.

Background Information

A known management system for building equipment transmits an instruction to a device included in the building equipment and then determines an occurrence of abnormality in the building equipment when a signal (herein referred to as a response) indicating that a state transition is made by the device in accordance with the instruction is not received.

For example, Japanese Unexamined Patent Application Publication No. 60-120124 discloses a management system that transmits various instructions to devices constituting a refrigeration apparatus, which is an example of building equipment, and determines an occurrence of abnormality in the building equipment when responses are not received within a predetermined reference time period.

SUMMARY

Designs of building equipment to be managed by such a management system or specifications of devices included in the building equipment are not necessarily standardized. The time required for devices to make a state transition in accordance with the relevant instruction therefore may vary from equipment to equipment, even if the devices are the same type. Differences in communication environment between sites where the building equipment is installed may produce nonuniformity in the time required to perform communications between the management system and the building equipment. Devices of the same type in the building equipment concerned may deteriorate over time, and the time required to make a state transition in accordance with the relevant instruction may vary from device to device accordingly. That is, the time interval between transmission of an instruction and reception of a response from the building equipment (in a normal operating condition) may vary depending on which management system is used or may vary when the same management system is used.

Therefore, in a case when such a management system use a single value as the reference time period, the value may not be suited to detection of abnormal conditions.

The present disclosure has therefore been made to provide a management system adoptable for building equipment and capable of accurately detecting abnormal conditions in the building equipment.

The management system is adoptable for building equipment. The management system includes an instruction transmission unit, a response reception unit, a detection unit, a storage unit, a time measurement unit, a mode setting unit, and a calculation unit. The instruction transmission unit transmits an instruction to a device or at least one of a plurality of devices included in the building equipment. The response reception unit receives a response indicating that a state transition is made by the device or the at least one of the plurality of devices in accordance with the instruction. The detection unit detects an abnormal condition. The abnormal condition is the state in which the response is not received by the response reception unit within a reference time period after transmission of the instruction by the instruction transmission unit. The storage unit stores the reference time period. The time measurement unit measures a length of time from when the instruction transmission unit transmits the instruction to when the response reception unit receives the response. The mode setting unit sets the operating mode of the management system to a reference-time-period calculation mode in which calculations are preformed to determine the reference time period. In the reference-time-period calculation mode, the calculation unit performs calculations to determine the reference time period based on a measurement result obtained by the time measurement unit and prompts the storage unit to store the determined reference time period.

The management system can use the reference time period with which abnormal conditions in the building equipment may be accurately detected based on the result of the actual measurement of the time interval between transmission of the instruction and reception of the response.

The management system is preferably configured in such a manner that the mode setting unit sets the operating mode to the reference-time-period calculation mode when the building equipment is in a predetermined state.

When the building equipment is in the predetermined state; that is, with the state of the building equipment outside the management system serving as a trigger, the reference time period can be determined by calculation based on the result of the actual measurement of the time interval between transmission of the instruction and reception of the response.

The predetermined state dealt with in the management system preferably includes at least one of a state in which the building equipment is newly installed, a state in which another device is additionally installed on the building equipment, a state in which the device or at least one of the plurality of devices included in the building equipment is renewed, and a state in which the device or one or more of the plurality of devices are removed from the building equipment.

In the above cases in which newly determination by calculation or update of the reference time period is preferable, calculations can be performed to determine the reference time period.

The mode setting unit preferably sets the operating mode to the reference-time-period calculation mode when the reference time period is not stored in the storage unit.

In the absence of needed reference time periods, calculations may be automatically performed to determine the reference time periods without omission.

The mode setting unit preferably sets the operating mode to the reference-time-period calculation mode when a predetermined time period has elapsed from storing of the reference time period in the storage unit and/or at a predetermined time.

This is advantageous because abnormal conditions in the building equipment may be accurately detected with effects of the age deterioration being suppressed owing to calculations performed to newly determine the reference time period even in a case that the time interval between transmission of an instruction and reception of a response may vary over time due to, for example, age deterioration of the device or the plurality of devices included in the building equipment.

It is preferred that the management system further include one or a plurality of networking members that communicably connect the management system and the building equipment to each other in such a manner as to enable the instruction transmission unit to transmit the instruction to the device or at least one of the plurality of devices included in the building equipment and to enable the response reception unit to receive the response. The mode setting unit preferably sets the operating mode to the reference-time-period calculation mode when the networking member or at least one of the plurality of networking members is renewed.

When the networking member is renewed and the time interval between transmission of the instruction and reception of the response may change, the reference time period is newly determined by calculation. Abnormal conditions in the building equipment may therefore be accurately detected.

It is preferred that the management system further include a request receiving unit. The request receiving unit receives a mode setting request that requests the mode setting unit to set the operating mode to the reference-time-period calculation mode. The mode setting unit preferably sets the operating mode to the reference-time-period calculation mode in response to the mode setting request.

The operating mode of the management system may be easily switched to the reference-time-period calculation mode so that calculations may be performed to determine the reference time period as the need arises.

It is preferred that the management system further include an indication unit. The indication unit provides an indication when an abnormal condition is detected by the detection unit.

This feature enables the operator of the building equipment to easily ascertain the occurrence of an abnormal condition.

The management system is preferably configured in such a manner that the calculation unit determines the reference time period by adding an allowance time to the length of time measured by the time measurement unit.

This feature eliminates or reduces the possibility that a typical level of delay that may be experienced in the reception of a response will be erroneously taken as abnormality in the building equipment due to the use of an excessively short reference time period.

The building equipment preferably includes a refrigeration apparatus. The refrigeration apparatus includes, as the device or at least one of the plurality of devices, at least one of a compressor, a cooling tower, a pump, an air handling unit, and a fan coil unit.

Even when the refrigeration apparatus as building equipment includes one or more devices that take time to stabilize the output, the reference time period that enables the accurate detection of the abnormal conditions in the building equipment may be determined by calculation based on the result of the actual measurement of the time interval between transmission of an instruction and reception of a response.

DETAILED DESCRIPTION OF EMBODIMENT(S)

The following describes, with reference to the drawings, embodiments of a management system for building equipment according to the present disclosure.

First Embodiment (1) Overall Configuration of Air Conditioning System

Figure 1:
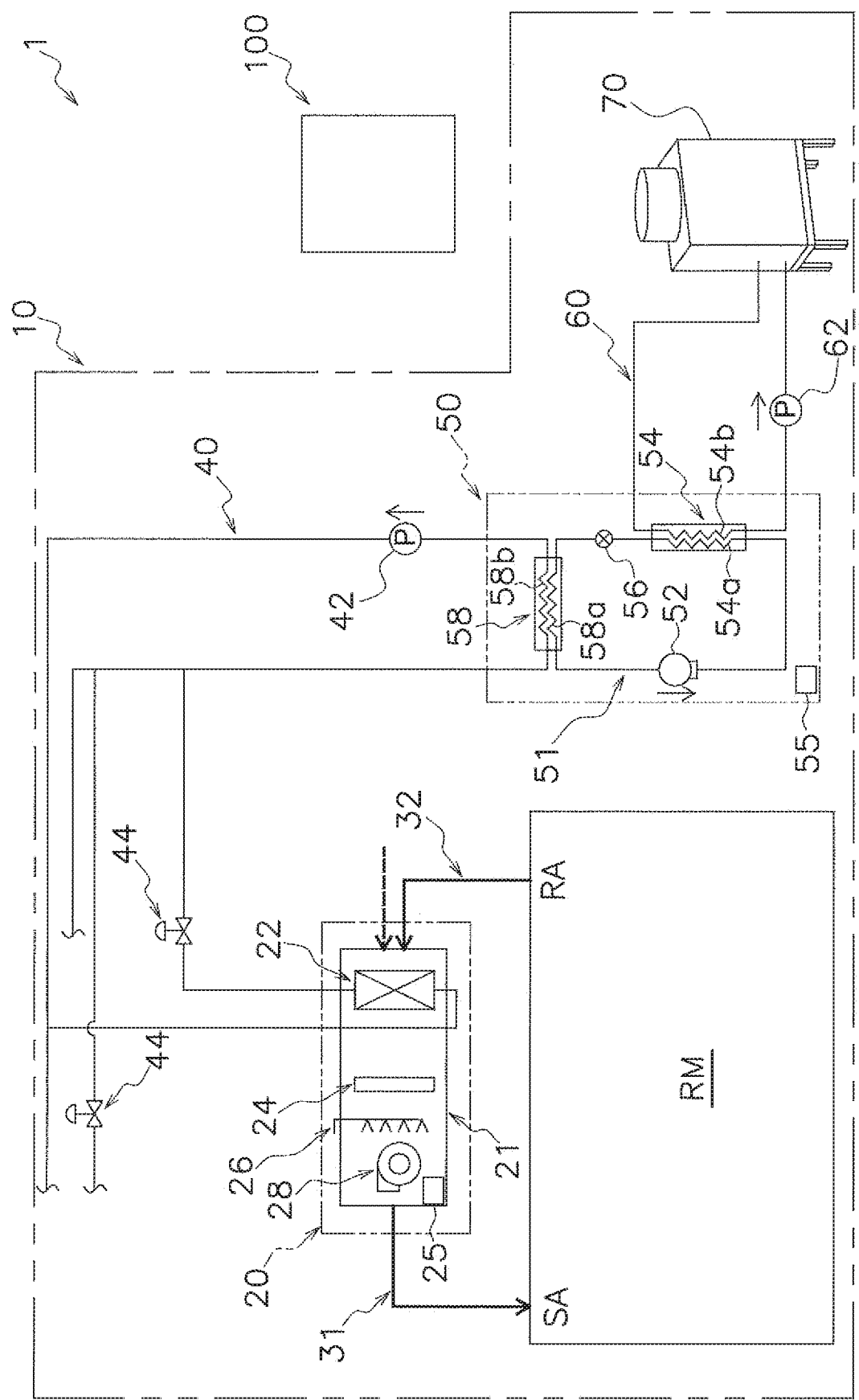
FIG. 1 is a schematic configuration diagram of an air conditioning system including a management system according to a first embodiment.
Figure 2:
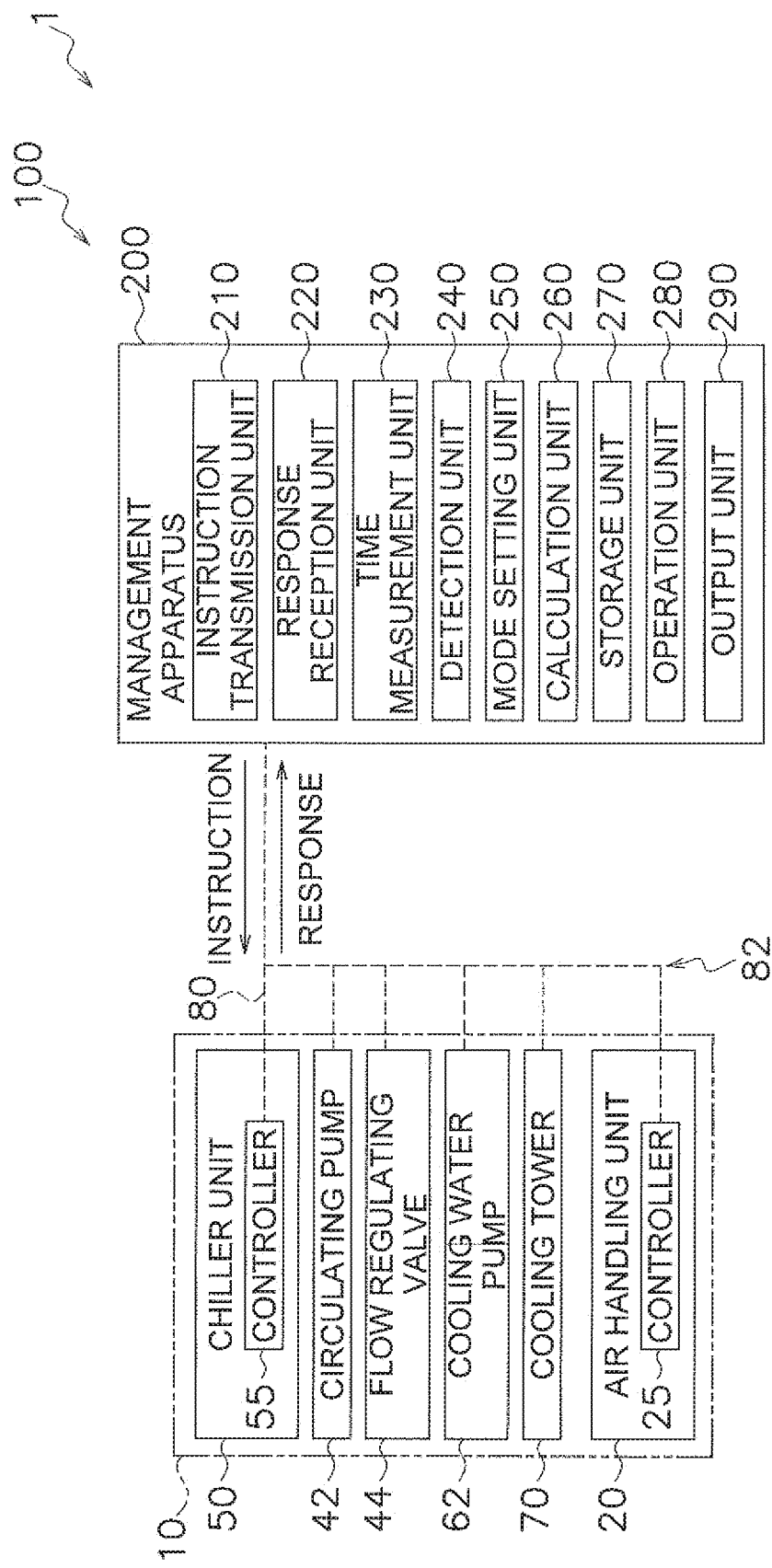
FIG. 2 is a block diagram of the air conditioning system illustrated in FIG. 1.

FIG. 1 is a schematic configuration diagram of an air conditioning system 1 including: an air conditioning apparatus 10, which is an example of a refrigeration apparatus; and a management system 100 for the air conditioning apparatus 10. The refrigeration apparatus is an example of the building equipment. FIG. 2 is a block diagram of the air conditioning system 1. The management system 100 is used to operate the air conditioning apparatus 10 and to monitor operating conditions of the air conditioning apparatus 10.

The air conditioning system 1 is configured to process a required amount of sensible heat load and a required amount of latent heat load in a room space RM to control the temperature and the humidity in the room space RM. As illustrated in FIG. 1, the air conditioning system 1 takes in room air RA from the room space RM, regulates the temperature and the humidity of the intake air, and feeds the resultant air, which is supply air SA, to the room space RM. The air conditioning system 1 is a system that air-conditions a relatively large building, such as an office building, a store, a hotel, a medical facility, or a plant.

The air conditioning apparatus 10 includes mainly a chiller unit 50, a plurality of air handling units 20, a circulating pump 42, and a cooling water pump 62 (see FIG. 1). The air handling unit 20 illustrated in FIGS. 1 and 2 is one of the air handling units 20 included in the air conditioning apparatus 10 in practical use. Alternatively, the air conditioning apparatus 10 may include one air handling unit 20. In the present embodiment, the air conditioning apparatus 10 includes one chiller unit 50, one cooling water pump 62, and one circulating pump 42. In some embodiments, the air conditioning apparatus 10 may include one or a plurality of chiller units 50, one or a plurality of cooling water pumps 62, and one or a plurality of circulating pumps 42. The air conditioning system 1 may include a plurality of fan coil units in place of the air handling units 20 or in addition to the air handling units 20.

Various devices included in the air conditioning apparatus 10 (devices which will be described later, such as the chiller unit 50, the circulating pump 42 and flow regulating valves 44 in a heat medium circuit 40, the cooling water pump 62 in a heat dissipating circuit 60, a cooling tower 70, and the air handling units 20) are communicably connected to the management system 100 through a communication line (communication cable) 80 (see FIG. 2).

The air conditioning apparatus 10 also includes a refrigerant circuit 51, the heat dissipating circuit 60, and the heat medium circuit 40 (see FIG. 1).

(2) Details on Configuration of Air Conditioning System

(2-1) Air Conditioning Apparatus

The following describes the chiller unit 50, the heat dissipating circuit 60, the heat medium circuit 40, and the air handling units 20 included in the air conditioning apparatus 10. Basic operation of the air conditioning apparatus 10 will be also described below.

(2-1-1) Chiller Unit

The chiller unit 50 includes mainly the refrigerant circuit 51 and a controller 55 (see FIG. 1).

The refrigerant circuit 51 is a closed circuit that allows refrigerant to circulate therethrough so that a vapor compression refrigeration cycle is performed. Refrigerant to be used in the refrigerant circuit 51 is not limited and may be a fluorocarbon-based refrigerant such as R32.

The refrigerant circuit 51 is connected mainly with a compressor 52, a first heat exchanger 54, an expansion mechanism 56, and a second heat exchanger 58 (see FIG. 1).

The compressor 52 is configured in such a way as to be capable of regulating the operating capacity. The compressor 52 includes a motor supplied with power through an inverter. When the output frequency of the inverter is changed, the number of revolutions (rotational speed) of the motor is changed accordingly. Consequently, the operating capacity of the compressor 52 is changed. Referring to FIG. 1, the arrow beside the compressor 52 indicates the direction in which the refrigerant in the refrigerant circuit 51 flows.

The first heat exchanger 54 functions as a radiator. The first heat exchanger 54 includes a first heat transfer tube 54*a* connected to the refrigerant circuit 51 and a second heat transfer tube 54*b* connected to the heat dissipating circuit 60 (see FIG. 1). The first heat exchanger 54 enables exchange of heat between refrigerant flowing through the first heat transfer tube 54*a* on the refrigerant circuit 51 side and a heat medium flowing through the second heat transfer tube 54*b* on the heat dissipating circuit 60 side. In the first heat exchanger 54, the heat medium flowing through the second heat transfer tube 54*b* cools high-temperature refrigerant discharged by the compressor 52.

The expansion mechanism 56 is a mechanism that decompresses the refrigerant cooled in the first heat exchanger 54. The expansion mechanism 56 is, for example, an electric expansion valve whose opening degree is adjustable. The expansion mechanism 56 is not limited to the electric expansion valve and may be another type of mechanism capable of decompressing refrigerant. For example, the expansion mechanism 56 may be a capillary tube.

The second heat exchanger 58 functions as an evaporator. The second heat exchanger 58 includes a first heat transfer tube 58*a* connected to the refrigerant circuit 51 and a second heat transfer tube 58*b* connected to the heat medium circuit 40 (see FIG. 1). The second heat exchanger 58 enables exchange of heat between refrigerant flowing through the first heat transfer tube 58*a* on the refrigerant circuit 51 side and a heat medium flowing through the second heat transfer tube 58*b* on the heat medium circuit 40 side. In the second heat exchanger 58, the refrigerant decompressed by the expansion mechanism 56 cools the heat medium flowing through the second heat transfer tube 58*b*. The refrigerant in the second heat exchanger 58 evaporates by exchanging heat with the heat medium and is then transferred to a suction port of the compressor 52.

The controller 55 controls the chiller unit 50. The controller 55 includes, for example, a microcomputer and a memory. The controller 55 is configured in such a way as to be capable of transmitting and receiving, for example, control signals to and from the management system 100 through the communication line 80. As an alternative to wire communications, radio communications may be performed. The controller 55 is also configured in such a way as to be capable of receiving measured values from, for example, various sensors (not illustrated) in the refrigerant circuit 51 and temperature sensors (not illustrated) downstream of the second heat exchanger 58 in the heat medium circuit 40.

The controller 55 receives various instructions transmitted by the management system 100. The controller 55 receives, from the management system 100, instructions such as a start instruction C, which is an instruction to start the operation of the chiller unit 50, and an instruction to change the set temperature of the heat medium flowing out of the second heat exchanger 58. The controller 55 controls the operation of various devices (e.g., the compressor 52 and the expansion mechanism 56) constituting the chiller unit 50 in accordance with, for example, various instructions or measured values acquired from the sensors.

The controller 55 transmits, to the management system 100, responses indicating that state transitions are made by the devices in the air conditioning apparatus 10 in accordance with various instructions. For example, the controller 55 transmits, to the management system 100, a response R, which indicates that a predetermined state transition is made in the chiller unit 50 in accordance with the start instruction C given to the chiller unit 50. Although the predetermined state transition made in accordance with the start instruction C is not limited, the predetermined state transition herein means that the temperature of the heat medium flowing out of the second heat exchanger 58 in the chiller unit 50 in operation becomes equal or close to the set temperature.

In the present embodiment, the air conditioning apparatus 10 includes the chiller unit 50, which uses the refrigeration cycle to cool the heat medium circulating through the heat medium circuit 40. In some embodiments, the air conditioning apparatus 10 may be a heating apparatus for the room space RM and may thus include, in place of the chiller unit 50 configured to cool the heat medium circulating through the heat medium circuit 40, a heat pump unit that uses the refrigeration cycle to heat the heat medium circulating through the heat medium circuit 40. Such a heat pump unit includes devices similar to the devices included in the chiller unit 50. However, the refrigerant discharged from the compressor 52 is transferred to the second heat exchanger 58, which functions as a radiator. The refrigerant is then decompressed in the expansion mechanism 56 and is then transferred to the first heat exchanger 54, which functions as an evaporator. In the first heat exchanger 54, the refrigerant preferably exchanges heat with medium such as a thermal discharge. The refrigerant evaporates in the first heat exchanger 54 and is then transferred to the suction port of the compressor 52. The heat pump unit may include a flow-direction switching mechanism that changes the flow direction of refrigerant so that the heat pump may be used to heat and cool the heat medium circulating through the heat medium circuit 40.

(2-1-2) Heat Dissipating Circuit

The heat dissipating circuit 60 is filled with a heat medium. The heat medium is not limited to a particular type of heat medium. In the present embodiment, the heat medium is water. The heat dissipating circuit 60 is connected with the first heat exchanger 54 of the chiller unit 50, the cooling water pump 62, and the cooling tower 70 (see FIG. 1).

The cooling water pump 62 is a pump whose displacement is adjustable; that is, a pump whose discharge flow rate is adjustable. The cooling water pump 62 is driven so that water, which is a heat medium, circulates through the heat dissipating circuit 60. Referring to FIG. 1, the arrow beside the cooling water pump 62 indicates the direction in which water in the heat dissipating circuit 60 flows.

The cooling water pump 62 is configured in such a way as to be capable of transmitting and receiving, for example, control signals to and from the management system 100 through the communication line 80. The cooling water pump 62 receives various instructions (e.g., an instruction to start the operation of the cooling water pump 62, an instruction to stop the operation of the cooling water pump 62, and an instruction to specify the number of revolutions of the motor of the cooling water pump 62) transmitted by the management system 100. The operation of the cooling water pump 62 is controlled in accordance with instructions received by the cooling water pump 62. The cooling water pump 62 transmits, to the management system 100, a response indicating that a state transition is made in accordance with the relevant instruction (e.g., a response indicating that the motor of the cooling water pump 62 is started in accordance with a start instruction).

The cooling tower 70 drives a cooling fan (not illustrated) to cool water (water whose temperature is increased due to heat exchange with refrigerant in the first heat exchanger 54) circulating through the heat dissipating circuit 60. The water cooled in the cooling tower 70 is transferred to the first heat exchanger 54.

The cooling tower 70 is configured in such a way as to be capable of transmitting and receiving, for example, control signals to and from the management system 100 through the communication line 80. The cooling tower 70 receives various instructions (e.g., an instruction to start the operation of the cooling tower 70 and an instruction to stop the operation of the cooling tower 70) transmitted by the management system 100. The operation of the cooling tower 70 is controlled in accordance with instructions received by the cooling tower 70. The cooling tower 70 transmits, to the management system 100, a response indicating that a state transition is made in accordance with the relevant instruction (e.g., a response indicating that the motor of the cooling fan of the cooling tower 70 is started in accordance with a start instruction).

(2-1-3) Heat Medium Circuit

The heat medium circuit 40 is a closed circuit filled with a heat medium. The heat medium is not limited to a particular type of heat medium. In the present embodiment, the heat medium is water. The heat medium circuit 40 is connected with the second heat exchanger 58 of the chiller unit 50, the circulating pump 42, and air-cooling heat exchangers 22 of the air handling units 20 (see FIG. 1).

The circulating pump 42 is a pump whose displacement is adjustable; that is, a pump whose discharge flow rate is adjustable. The circulating pump 42 is driven so that water, which is a heat medium, circulates through the heat medium circuit 40. Referring to FIG. 1, the arrow beside the circulating pump 42 indicates the direction in which water in the heat medium circuit 40 flows.

The circulating pump 42 is configured in such a way as to be capable of transmitting and receiving, for example, control signals to and from the management system 100 through the communication line 80. The circulating pump 42 receives various instructions (e.g., an instruction to start the operation of the circulating pump 42, an instruction to stop the operation of the circulating pump 42, and an instruction to specify the number of revolutions of a motor of the circulating pump 42) transmitted by the management system 100. The operation of the circulating pump 42 is controlled in accordance with instructions received by the circulating pump 42. The circulating pump 42 transmits, to the management system 100, a response indicating that a state transition is made in accordance with the relevant instruction (e.g., a response indicating that the motor of the circulating pump 42 is started in accordance with a start instruction).

In each air-cooling heat exchanger 22 of the corresponding one of the air handling units 20, air supplied to the air-cooling heat exchanger 22 is cooled due to heat exchange with the water circulating as a heat medium through the heat medium circuit 40. The cooled air, which is the supply air SA, is supplied to the room space RM.

The air conditioning apparatus 10 in the present embodiment includes the plurality of air handling units 20 as described above. The heat medium circuit 40 forms a connection between each of the air-cooling heat exchangers 22 of the corresponding air handling units 20 and the second heat exchanger 58 of the chiller unit 50. Pipes disposed on the outlet side of the air-cooling heat exchangers 22 of the corresponding air handling units 20 are provided with the respective flow regulating valves 44. Each flow regulating valve 44 is, for example, a motor-operated valve whose opening degree is adjustable.

Each flow regulating valve 44 is configured in such a way as to be capable of transmitting and receiving, for example, control signals to and from the management system 100 through the communication line 80. Each flow regulating valve 44 receives various instructions (e.g., an instruction to specify the opening degree of the flow regulating valve 44) transmitted by the management system 100. The operation of each flow regulating valve 44 is controlled in accordance with instructions received by the flow regulating valve 44. Each flow regulating valve 44 transmits, to the management system 100, a response indicating that a state transition is made in accordance with the relevant instruction.

The whole quantity of the heat medium circulating through the heat medium circuit 40 is adjusted in accordance with the discharge flow rate of the circulating pump 42. The quantity of the heat medium flowing through each of the air-cooling heat exchangers 22 of the corresponding air handling units 20 is regulated in accordance with the opening degree of the flow regulating valve 44 provided for the air handling unit 20 concerned.

(2-1-4) Configuration of Air Conditioning Unit

Each air handling unit 20 has a casing 21, which is substantially cuboid-shaped. The casing 21 has an air passage through which a flow of air passes. An inflow end of the air passage is connected with one end of an intake duct 32. The other end of the intake duct 32 is connected to the room space RM. An outflow end of the air passage is connected with one end of an air supply duct 31. The other end of the air supply duct 31 is connected to the room space RM.

The air passage in the casing 21 is provided with, in the order from the upstream side to the downstream side in the flow direction of air, the air-cooling heat exchanger 22, an electric heater 24, a sprinkler humidifier 26, and a fan 28. The electric heater 24 heats air coming out of the air-cooling heat exchanger 22. The electric heater 24 is a device for raising the temperature of air. The heat output of the electric heater 24 may be changed in stages, and the amount of heat applied to the air may be regulated accordingly. The sprinkler humidifier 26 humidifies air flowing through the casing 21 in such a manner that water in a tank (not illustrated) disposed outside the casing 21 is sprayed from a nozzle into air. The sprinkler humidifier 26 is a device for raising the humidity of air and is capable of regulating the amount of air to be humidified. The fan 28 can change the number of revolutions in stages through inverter control, and can control the amount of air to be sent out accordingly. The fan 28 creates a flow of air blown into the room space RM through the air-cooling heat exchanger 22, the electric heater 24, and the sprinkler humidifier 26.

The air-cooling heat exchanger 22 is a device for lowering the temperature of air by cooling air and for lowering the humidity by dehumidifying air. The air-cooling heat exchanger 22 is thus capable of cooling and dehumidifying air. The air-cooling heat exchanger 22 can cool air to or below the dew-point temperature. The air-cooling heat exchanger 22 is a fin-and-tube heat exchanger including heat transfer fins and heat transfer tubes extending through the heat transfer fins. Cold water, which is a heat medium circulating through the heat medium circuit 40, flows through the heat transfer tubes of the air-cooling heat exchanger 22. The air-cooling heat exchanger 22 cools air in such a manner that the cold of chilled water is supplied to air through the heat transfer tubes and the heat transfer fins.

Each air handling unit 20 includes a controller 25, which controls the operation of the individual devices included in the air handling unit 20. The controller 25 includes, for example, a microcomputer and a memory. The controller 25 is configured in such a way as to be capable of transmitting and receiving, for example, control signals to and from the management system 100 through the communication line 80. As an alternative to wire communications, radio communications may be performed. The controller 25 is also configured in such a way as to be capable of receiving measured values from, for example, various sensors disposed in the room space RM.

The controller 25 receives various instructions transmitted by the management system 100. The controller 25 receives, from the management system 100, instructions such as an instruction to start the operation of the air handling unit 20 and an instruction to change the set temperature or the set humidity in the room space RM. The controller 25 controls the operation of various devices (e.g., the electric heater 24, the sprinkler humidifier 26, and the fan 28) constituting the air handling unit 20 in accordance with, for example, various instructions or measured values acquired from the sensors.

The controller 25 transmits, to the management system 100, responses indicating that state transitions are made by the devices in the air conditioning apparatus 10 in accordance with various instructions. For example, the controller 55 transmits, to the management system 100, a response indicating that the fan 28 is started in accordance with an start instruction.

(2-1-5) Basic Operation of Air Conditioning Apparatus

The following describes basic operation of the air conditioning apparatus 10. The air conditioning apparatus 10 selectively performs a cooling and dehumidifying operation that enables cooling and dehumidification of air, a cooling and humidifying operation that enables cooling and humidification of air, a heating and dehumidifying operation that enables dehumidification and heating of air, and a heating and humidifying operation that enables heating and humidification of air. In this way, air conditioning is performed so that the temperature and the humidity in the room space RM are controlled to the set temperature and the set humidity that are input by the management system 100.

(A) Cooling and Dehumidifying Operation

During the cooling and dehumidifying operation, the compressor 52, the cooling water pump 62, the circulating pump 42, and the fans 28 are operated. During the cooling and dehumidifying operation, the electric heaters 24 are not operated, and water is not sprinkled by the sprinkler humidifiers 26.

During the cooling and dehumidifying operation, refrigeration cycle is performed in the refrigerant circuit 51. Specifically, refrigerant compressed in the compressor 52 flows into the first heat exchanger 54, where the refrigerant is condensed by transferring heat to water flowing through the heat dissipating circuit 60. The refrigerant cooled in the first heat exchanger 54 is decompressed in the expansion mechanism 56 and then flows into the second heat exchanger 58, where the refrigerant evaporates by receiving heat from water flowing through the heat medium circuit 40. After evaporating in the second heat exchanger 58, the refrigerant is sucked into the compressor 52, where the refrigerant is compressed.

Water heated in the first heat exchanger 54 flows through the heat dissipating circuit 60 and enters the cooling tower 70, where the water transfers heat to the outdoor air. After transferring heat in the cooling tower 70, the water is sent back to the first heat exchanger 54.

Water cooled in the second heat exchanger 58 flows through the heat medium circuit 40 and enters the air-cooling heat exchanger 22, where the water cools air flowing through the air passage in the casing 21. After passing through the air-cooling heat exchanger 22, the water is sent back to the second heat exchanger 58 in the refrigerant circuit 51 and is cooled again. The cold received by water from refrigerant in the second heat exchanger 58 is transferred to the air-cooling heat exchanger 22 through the heat medium circuit 40 and is then supplied to air.

In the air handling unit 20, the room air RA taken in from the room space RM through the intake duct 32 flows through the air passage in the casing 21. In the air-cooling heat exchanger 22, the air is cooled and dehumidified by water circulating through the heat medium circuit 40. After being cooled and dehumidified in the air-cooling heat exchanger 22, the air passes through the air supply duct 31 and is then supplied as the supply air SA to the room space RM.

The cooling and dehumidifying operation is performed in such instances where it is determined, with reference to the set temperature and set humidity specified for the room space RM, that the room air needs to be cooled and dehumidified by the air-cooling heat exchanger 22 and there is no need for reheating or humidification.

(B) Cooling and Humidifying Operation

During the cooling and humidifying operation, humidification is performed by sprinkling water with sprinkler humidifier 26 in addition to the cooling and dehumidifying operation mentioned above. In the air-cooling heat exchanger 22, air is cooled and dehumidified by water flowing through the heat medium circuit 40. In this regard, the cooling and humidifying operation is identical to the cooling and dehumidifying operation mentioned above. During the cooling and humidifying, operation, the air is cooled and dehumidified and then water is sprinkled into the air by the sprinkler humidifier 26.

The cooling and humidifying operation is performed in such instances where with the set temperature being attained through cooling and dehumidification performed by the air-cooling heat exchanger 22, but the resultant humidity in the room space RM falls below the set humidity due to the effects of dehumidification associated with the cooling.

(C) Heating and Dehumidifying Operation

The heating and dehumidifying operation is also referred to as a reheating and dehumidifying operation. During the heating and dehumidifying operation, air is subjected to the treatment identical to what is performed in the cooling and dehumidifying operation and is then reheated by the electric heater 24. The heating and dehumidifying operation is performed as follows: air cooled and dehumidified in the air-cooling heat exchanger 22 by water circulating through the heat medium circuit 40 is heated by the electric heater 24 and is then supplied as the supply air SA to the room space RM through the air supply duct 31.

The heating and dehumidifying operation is performed in such instances where with the set humidity being attained through dehumidification performed by the air-cooling heat exchanger 22, but the temperature of the room space RM would fall below the set temperature due to a large amount of cold applied to the for dehumidification.

(D) Heating and Humidifying Operation

During the heating and humidifying operation, the electric heaters 24, the sprinkler humidifiers 26, and the fans 28 are operated. Meanwhile, the compressor 52, the cooling water pump 62, and the circulating pump 42 are not operated during the heating and humidifying operation. The heating and humidifying operation is performed as follows: in the air handling unit 20, air taken in from the room space RM is heated by the electric heater 24, is subsequently humidified by the sprinkler humidifier 26, and is then supplied as the supply air SA to the room space RM.

(2-2) Management System

The management system 100 is used to operate the air conditioning apparatus 10 and to monitor operating conditions of the air conditioning apparatus 10.

The management system 100 includes mainly a management apparatus 200 (see FIG. 1). The management apparatus 200 is a computer that includes, a processor, a storage device including a main storage device and an auxiliary storage device, an input device (e.g., an operation unit 280 (see FIG. 2)) that receives operations performed by an operator of the management system 100, an output device (e.g., an output unit 290 (see FIG. 2)) that outputs various pieces of information to the operator of the management system 100, and a communication interface that are connected to each other through a bus.

The management apparatus 200 in the present embodiment is merely an example. Hardware such as a logic circuit or a combination of hardware and software may perform functions similar to the following functions of the management apparatus 200 in the present embodiment.

The management apparatus 200 of the management system 100 is connected to various devices in the air conditioning apparatus 10 through the communication line 80. As an alternative to wire communications, radio communications may be performed. For example, the management apparatus 200 is communicably connected to the controller 55 of the chiller unit 50, the circulating pump 42, the flow regulating valves 44, the cooling water pump 62, the cooling tower 70, and the controllers 25 of the air handling units 20 (see FIG. 2). The management apparatus 200 may be configured in such a way as to be capable of receiving measured values from, for example, all or some of the sensors in the refrigerant circuit 51, all or some of the sensors in the heat medium circuit 40, and all or some of the sensors in the heat dissipating circuit 60.

The management apparatus 200 causes a processor to execute programs stored in the storage device, and various types of processing and various types of computations are performed accordingly. For example, the management apparatus 200 causes the processor to execute programs, thus functioning as an instruction transmission unit 210, a response reception unit 220, a time measurement unit 230, a detection unit 240, a mode setting unit 250, and a calculation unit 260 (see FIG. 2). In other words, the management apparatus 200 includes, as functional units, the instruction transmission unit 210, the response reception unit 220, the time measurement unit 230, the detection unit 240, the mode setting unit 250, and the calculation unit 260.

The storage device of management apparatus 200 includes a storage unit 270 (see FIG. 2). The storage unit 270 stores a reference time period that will be described later.

The following describes the instruction transmission unit 210, the response reception unit 220, the time measurement unit 230, the detection unit 240, the mode setting unit 250, the calculation unit 260, the storage unit 270, the operation unit 280, and the output unit 290, which are included in the management apparatus 200 of the management system 100.

(2-2-1) Instruction Transmission Unit

The instruction transmission unit 210 transmits, though the communication line 80, instructions to the devices included in the air conditioning apparatus 10.

When the operator of the management system 100 performs various operations on the operation unit 280, the instruction transmission unit 210 transmits, to the air conditioning apparatus 10, instructions corresponding to the performed operations. The instruction transmission unit 210 may transmit scheduled instructions to the air conditioning apparatus 10 at scheduled timings.

For example, the instruction transmission unit 210 transmits, to the controller 55 of the chiller unit 50, instructions such as an instruction to start the operation of the chiller unit 50 and an instruction to change the set temperature specified for the heat medium flowing out of the second heat exchanger 58 of the chiller unit 50. The instruction transmission unit 210 may also transmit, to the circulating pump 42 or the cooling water pump 62, instructions such as an instruction to start the operation of the circulating pump 42 or the cooling water pump 62, an instruction to stop the operation of the circulating pump 42 or the cooling water pump 62, and an instruction to change the number of revolutions of the motor of the circulating pump 42 or of the cooling water pump 62. The instruction transmission unit 210 may also transmit, to each flow regulating valve 44, an instruction to change the degree of opening of the flow regulating valve 44. The instruction transmission unit 210 may also transmit, to each of the controllers 25 of the air handling units 20, an instruction to start the operation the relevant air handling unit 20, an instruction to stop the operation of the relevant air handling unit 20, and an instruction to change the set temperature or the set humidity specified for the room space RM that is to be air conditioned by the relevant air handling unit 20. When the air conditioning apparatus 10 includes, in place of the chiller unit 50, a heat pump unit capable of selectively cooling and heating the heat medium circulating through the heat medium circuit 40, the instruction transmission unit 210 may transmit an instruction to switch the heat pump unit from heat-medium cooling operation to heat-medium heating operation, and vice versa.

Instructions that may be transmitted by the instruction transmission unit 210 are not limited to these instructions cited as examples. Some of the instructions may not be transmitted by the instruction transmission unit 210. Instructions other than the instructions cited as examples may be transmitted by the instruction transmission unit 210.

(2-2-2) Response Reception Unit

The response reception unit 220 receives, through the communication line 80, responses (signals) indicating that state transitions are made by the devices in the air conditioning apparatus 10 in accordance with instructions transmitted by the instruction transmission unit 210.

Such a response indicating that a state transition is made by one of the devices in the air conditioning apparatus 10 in accordance with an instruction transmitted by the instruction transmission unit 210 may be transmitted when the operation of the relevant device enters a predetermined state. Alternatively, such a response indicating that a state transition is made by one of the devices in the air conditioning apparatus 10 in accordance with an instruction transmitted by the instruction transmission unit 210 may be transmitted when refrigerant or a heat medium is brought into a predetermined state as a result of an action of the relevant device.

Specifically; when an instruction to start the operation of the circulating pump 42 is transmitted by the instruction transmission unit 210, the response to the instruction is a signal indicating that the circulating pump 42 starts its operation.

When the start instruction C, which is an instruction to start the operation of the chiller unit 50, is transmitted by the instruction transmission unit 210, the response R to the instruction is a signal indicating that the chiller unit 50 is brought into an actuation state. The response R, which indicates that the chiller unit 50 is brought into the actuation state, refers to the state in which the value acquired by a sensor (not illustrated) that senses the temperature of the heat medium flowing out of the second heat exchanger 58 is close to the set temperature (e.g., 2° C. above the set temperature) as a result of the operation of the chiller unit 50. While the chiller unit 50 is in operation, the circulating pump 42, the cooling water pump 62, and the cooling tower 70 are operated in predetermined conditions and at least one of the flow regulating valves 44 is opened to a predetermined extent.

Not every instruction transmitted by the instruction transmission unit 210 demands a response indicating that a state transition is made by the relevant device in the air conditioning apparatus 10 in accordance with the instruction transmitted by the instruction transmission unit 210. In other words, some of the instructions that are to be transmitted by the instruction transmission unit 210 may demand no response from the air conditioning apparatus 10.

(2-2-3) Time Measurement Unit

The time measurement unit 230 measures the length of time from when the instruction transmission unit 210 transmits an instruction to when the response reception unit 220 receives a response to the instruction. The time measurement unit 230 is used, for example, to determine reference time periods by calculation.

The individual reference time periods are values determined by calculation for the respective types of instructions. The reference time period associated with an instruction (an instruction X) is the time it takes, in the air conditioning system 1 in working order, to receive a response to the instruction X after transmission of the instruction X by the instruction transmission unit 210. When the reference time period associated with the instruction X is equal to 10 seconds, a response to the instruction X will be received, in the air conditioning system 1 in working order, within 10 seconds of the instruction transmission unit 210 transmitting the instruction X.

(2-2-4) Detection Unit

The detection unit 240 detects an abnormal condition in which a response to an instruction transmitted by the instruction transmission unit 210 is not received by the response reception unit 220 within the reference time period specified for the instruction (the reference time period associated with the instruction and stored in the storage unit 270, which will be described later) after transmission of the instruction by the instruction transmission unit 210). That is, the detection unit 240 detects an abnormal condition that is the state in which a response to an instruction transmitted by the instruction transmission unit 210 is yet to be received at the moment when the response ought to be received in the air conditioning system 1 in working order. In other words, the detection unit 240 detects an abnormal condition that is the state in which a response to an instruction transmitted by the instruction transmission unit 210 is yet to be received after a lapse of the reference time period (waiting time required to determine the occurrence of abnormality).

When an abnormal condition is detected by the detection unit 240, the output unit 290, which will be described later, indicates that an abnormal condition is detected.

(2-2-5) Mode Setting Unit

The mode setting unit 250 sets the operating mode of the management apparatus 200 of the management system 100 to a reference-time-period calculation mode in which calculations are performed to determine the reference time period. The reference-time-period calculation mode is an operating mode in which the reference time period for use by the detection unit 240 in detecting abnormal conditions is determined by calculation and is then stored in the storage unit 270.

The mode setting unit 250 sets the operating mode of the management apparatus 200 to the reference-time-period calculation mode when the air conditioning apparatus 10 is in a predetermined state. The predetermined state herein includes, for example, at least one of the following states: the state in which the air conditioning apparatus 10 is newly installed; the state in which another device is additionally installed on the air conditioning apparatus 10; the state in which at least one device in the air conditioning apparatus 10 is renewed; and the state in which one or more devices are removed from the air conditioning apparatus 10.

Specifically, the mode setting unit 250 sets the operating mode to the reference-time-period calculation mode, for example, when a reference time period of interest is not stored in the storage unit 270, which is configured to store reference time periods.

When the air conditioning apparatus 10 is newly installed, no reference time period is stored in the storage unit 270. The mode setting unit 250 thus sets the operating mode of the management apparatus 200 to the reference-time-period calculation mode in the state in which the air conditioning apparatus 10 is newly installed.

As a rule, the air conditioning apparatus 10 is given a trial run in each of the following states: the state in which another device is additionally installed on the air conditioning apparatus 10; the state in which at least one of the devices in the air conditioning apparatus 10 is renewed; and the state in which one or more devices are removed from the air conditioning apparatus 10. When the air conditioning apparatus 10 is given a trial run, the operation unit 280 preferably receives an operation (a first operation) indicating that a trial run of the air conditioning apparatus 10 is conducted. When the operation unit 280 receives the first operation, the reference time periods stored in the storage unit 270 are preferably erased. With these setups having been made, the mode setting unit 250 can set the operating mode of the management apparatus 200 to the reference-time-period calculation mode in each of the following states: the state in which another device is additionally installed on the air conditioning apparatus 10; the state in which at least one of the devices in the air conditioning apparatus 10 is renewed; and the state in which one or more devices are removed from the air conditioning apparatus 10.

Not only the absence of reference time periods in the storage unit 270 but also other situations may trigger the mode setting unit 250 to set the operating mode of the management apparatus 200 of the management system 100 to the reference-time-period calculation mode. The operation unit 280 preferably receives a mode setting request issued as a request that the mode setting unit 250 sets the operating mode of the management system 100 to the reference-time-period calculation mode. The mode setting unit 250 preferably sets the operating mode to the reference-time-period calculation mode in response to the mode setting request. In this setup, reference time periods already stored in the storage unit 270, if any, are preferably updated to corresponding reference time periods newly determined by the calculation unit 260, which will be described later.

The reference time periods for the relevant air conditioning apparatus 10 are determined on-site; that is, the reference time periods are determined by calculation for the individual air conditioning apparatuses 10. The reason for this is as follows.

The individual devices the chiller unit 50, the circulating pump 42, the flow regulating valves 44, the cooling water pump 62, the cooling tower 70, and the air handling units 20) included in one air conditioning apparatus 10 and corresponding devices included in another air conditioning apparatus 10 are not necessarily of the devices having the same specification made by the same manufacturer. The manufactures and specifications of products may vary from installation site to installation site. In such instances, even when the devices are of the same type, the devices may act in different manners. The time it takes to make a transition from one state to another state may vary from device to device accordingly.

Wiring (between the management apparatus 200 and each of the various devices in the air conditioning apparatus 10) is laid at the installation site of the air conditioning apparatus 10. Thus, the length of the communication line (communication cable) 80 may vary depending on installation conditions. An increase in the cable length will result in a reduction in signal transmission speed. Communication conditions (the state of communication traffic between the management apparatus 200 and each of the various devices in the air conditioning apparatus 10) may vary depending on where the air conditioning apparatus 10 is installed.

As a response to an instruction, a signal may be transmitted when refrigerant or a heat medium is brought into a predetermined state as a result of an action performed by the relevant device in accordance with the instruction. In such a case in particular, the time interval between transmission of the instruction and reception of the response may vary depending on the conditions of the installation site of the air conditioning apparatus 10 (e.g., the temperature of outside air).

These factors may be responsible for site-to-site variations in the time interval between transmission of an instruction and reception of a response to the instruction.

The following problems may arise if the detection unit 240 uses a uniform reference time period.

When the set reference time period is short, the detection unit 240 may erroneously take a normal condition as an abnormal condition. In such a case, otherwise unnecessary inspections or maintenance of the air conditioning apparatus 10 will be conducted, thus resulting in increases in maintenance costs and making the management work more burdensome. When the reference time period is long, the detection unit 240 may belatedly detect an abnormal condition. In such a case, a malfunction in the air conditioning apparatus 10 that may be due to any failed device may be left unaddressed for a relatively long time.

To work around these problems, the management system 100 works as follows. When, for example, the air conditioning apparatus 10 is newly installed, the time interval between transmission of an instruction and reception of a response is determined by actual measurement and the reference time period is set based on the measurement result, as will be described later. Consequently, optimal reference time periods for the air conditioning apparatus 10 are available for use by management system 100.

The air conditioning apparatus 10 includes devices such as the compressor 52, the cooling tower 70, the circulating pump 42, the cooling water pump 62, the air handling units 20, and fan coil units. It takes time to stabilize the output of these devices because of the characteristics of the individual devices. The time interval between transmission of an instruction and reception of a response in the air conditioning system 1 in working order may thus be as long as several minutes to several dozen minutes. When a large number of reference time periods are to be set for the air conditioning apparatus 10, it is quite often that a considerable amount of time is required to determine these reference time periods by calculation. Therefore, the management system 100 is configured as follows. Once the operating mode of the management apparatus 200 is set to the reference-time-period calculation mode, the calculation unit 260 automatically performs calculations to determine the reference time periods, as will be described later. This feature saves time needed by workers involved in setting reference time periods and enables a reduction in labor costs (man hours) associated with trial runs. In a case when a building with a floor area of about 3,000 m² is equipped with the air conditioning system 1, it is expected that the man hours will drop about 40% owing to the management system 100 as compared to the case in which workers are involved in setting reference time periods.

The mode setting unit 250 sets the operating mode of the management apparatus 200 of the management system 100 to a normal mode. In the normal mode, which is one of the operating modes of the management apparatus 200, the detection unit 240 detects an abnormal condition in which a response to an instruction transmitted by the instruction transmission unit 210 is not received by the response reception unit 220 within the reference time period specified for the instruction (the reference time period associated with the instruction and stored in the storage unit 270, which will be described later) after transmission of the instruction by the instruction transmission unit 210.

(2-2-6) Calculation Unit

When the mode setting unit 250 sets the operating mode of the management apparatus 200 of the management system 100 to the reference-time-period calculation mode, the calculation unit 260 performs calculations to determine the reference time period based on the measurement result obtained by the time measurement unit 230.

Specifically, when the mode setting unit 250 sets the operating mode of the management system 100 to the reference-time-period calculation mode, the time measurement unit 230 determines, by actual measurement, the length of time from when the instruction transmission unit 210 transmits an instruction to when the response reception unit 220 receives a response to the instruction.

The calculation unit 260 then determines the reference time period by adding a predetermined allowance time (e.g., five seconds) to the length of time measured by the time measurement unit 230. The calculation unit 260 may determine the reference time period in such a manner as to multiply, by a predetermined allowance factor (e.g., 1.2), the length of time measured by the time measurement unit 230.

In the reference-time-period calculation mode, the time measurement unit 230 may measure, on an individual transmission basis, the lengths of time from when the instruction transmission unit 210 transmits instructions to when the response reception unit 220 receives responses to the corresponding instructions. The calculation unit 260 may determine the reference time period by using, for example, a mean value, a median value, or a maximum value of the measured lengths of time (by adding the allowance time to the mean value, the median value, or the maximum value or by multiplying the mean value, the median value, or the maximum value by the allowance factor).

After performing calculations to determine the reference time period, the calculation unit 260 prompts the storage unit 270 to store the determined reference time period.

The reference time period determined by the calculation unit 260 is preferably output (indicated) to the output unit 290 before being stored in the storage unit 270. The operation unit 280 preferably permits, for example, the operator of the air conditioning system 1 to decide whether to consent to the reference time period output to the output unit 290 being stored in the storage unit 270.

(2-2-7) Storage Unit

The storage unit 270 stores the reference time periods determined by the calculation unit 260. The storage unit 270 stores, on an individual instruction basis, the reference time periods determined for corresponding instructions transmitted by the instruction transmission unit 210.

(2-2-8) Operation Unit

The operation unit 280 receives various operation inputs performed by the operator of the air conditioning system 1. The operation unit 280 is, for example, a switch or a touch panel display. In such cases as those mentioned above, various operations performed by the operator of the air conditioning system 1 may be input to the operation unit 280.

(2-2-9) Output Unit

The output unit 290 is a display that displays various pieces of information. The output unit 290 displays, for example, the reference time period determined by the calculation unit 260. When an abnormal condition is detected by the detection unit 240, the output unit 290 displays information indicating that an abnormal condition is detected. The output unit 290 may be configured in such a way as to be capable of displaying, in list form, the reference time periods stored in the storage unit 270 on an individual instruction basis.

(3) Reference-Time-Period Calculation and Setting Processing

Figure 3:
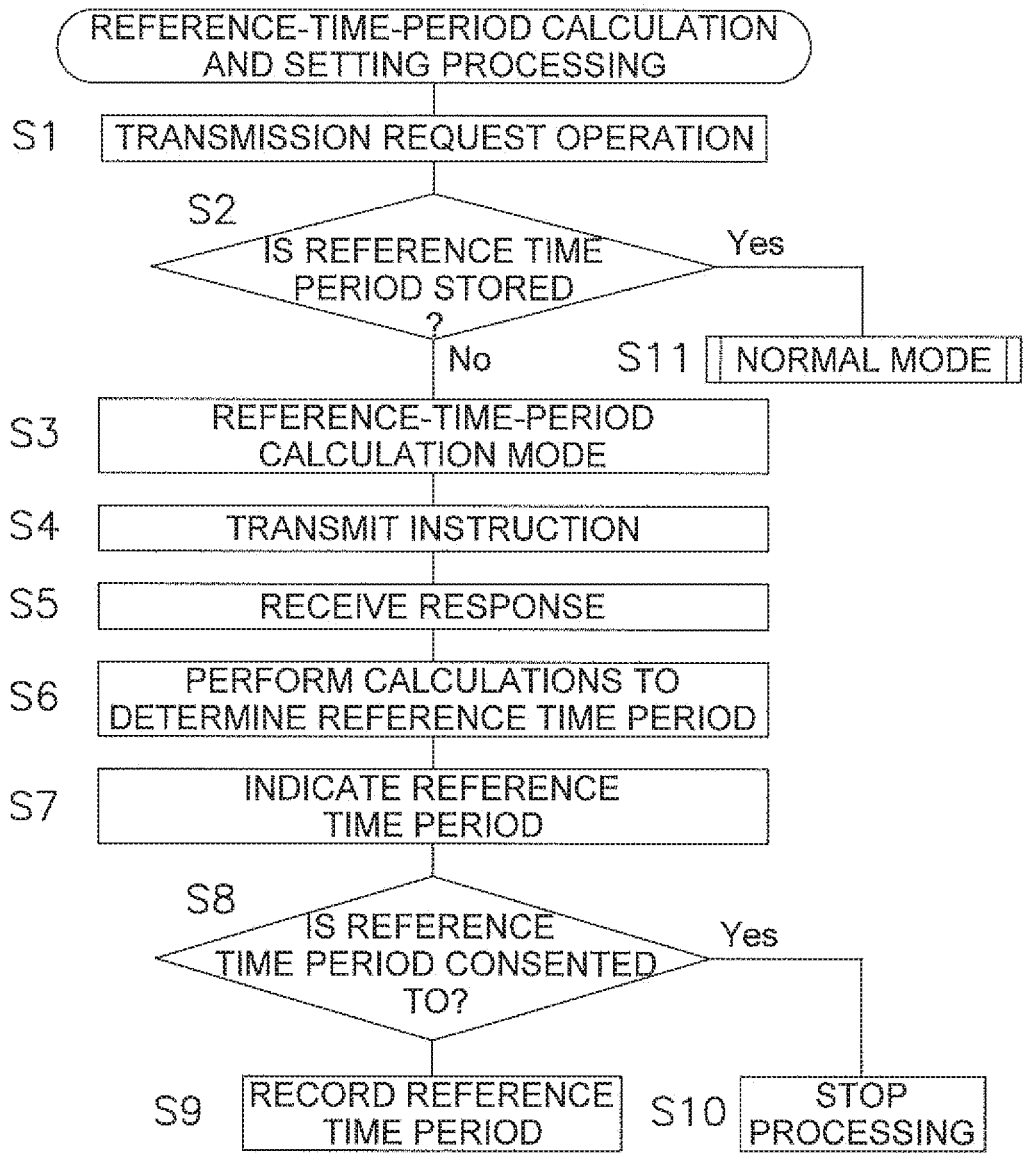
FIG. 3 is a flowchart for describing an example of reference-time-period calculation and setting processing executed by the management system illustrated in FIG. 1.

With reference to the flowchart in FIG. 3, the following describes reference-time-period calculation and setting processing executed by the management system 100.

Referring to the flowchart in FIG. 3, the absence of reference time periods in the storage unit 270 triggers the mode setting unit 250 to set the operating mode of the management system 100 to the reference-time-period calculation mode (see Step S2 in FIG. 3). Alternatively, the reception of the mode setting request by the operation unit 280 may trigger the execution of processing in Step S3 and the subsequent steps.

The following takes, as an example, an instance where the reference-time-period calculation and setting processing is executed when a transmission request operation associated with the start instruction C, which is an instruction to start the operation of the chiller unit 50 of the air conditioning apparatus 10, is received by the operation unit 280. The flow chart is also applicable to instances where the reference-time-period calculation and setting processing is executed when other instructions (e.g., instructions to devices other than the chiller unit 50 in the air conditioning apparatus 10 and instructions to the chiller unit 50 other than the start instruction C) are received by the operation unit 280, and such instances will not be further elaborated here.

To begin with, an operation (a transmission request operation) is performed on the operation unit 280 in Step S1 to make a request that the instruction transmission unit 210 transmit the start instruction C to the controller 55 of the chiller unit 50.

The mode setting unit 250 then determines whether any reference time period for the start instruction C (any reference time period associated with the start instruction C) is stored in the storage unit 270 (Step S2). When it is determined that no reference time period for the start instruction C is stored in the storage unit 270, the mode setting unit 250 sets the operating mode of the management system 100 to the reference-time-period calculation mode (Step S3). When it is determined that the reference time period for the start instruction C is stored in the storage unit 270, the mode setting unit 250 sets the operating mode of the management system 100 to the normal mode (Step S11). Operation of the management system 100 in the normal mode enabled as the operating mode of the management system 100 will be described later.

When the operating mode of the management system 100 is set to the reference-time-period calculation mode, the instruction transmission unit 210 transmits, in Step S4, the start instruction C to the controller 55. At the point in time when the start instruction C is transmitted, the circulating pump 42, the cooling water pump 62, and the cooling tower 70 are operated in predetermined conditions and at least one of the flow regulating valves 44 is opened to a predetermined extent. In some embodiments, reference time periods associated with the actuation of the devices 42, 44, 62, and 70 may also be determined by calculation.

In Step S5, the response R, which is transmitted by the controller 55 to the management system 100 and indicates that a state transition is made by the chiller unit 50 in accordance with the start instruction C, is received. The time measurement unit 230 measures a time period t, which is the length of time from when the instruction transmission unit 210 transmits the start instruction C to when the response reception unit 220 receives the response R. The predetermined state transition made in accordance with the start instruction C herein means that the temperature of the heat medium flowing out of the second heat exchanger 58 in the chiller unit 50 in operation becomes equal or close to the set temperature (e.g., 2° C. above the set temperature).

In Step S6, the calculation unit 260 performs calculations to determine the reference time period based on the measurement result obtained by the time measurement unit 230. For example, the calculation unit 260 adds an allowance time α to the time period t determined by the time measurement unit 230 and provides the result (t+α) as the reference time period.

In Step S7, a display provided as the output unit 290 indicates (displays) the reference time period determined by the calculation unit 260.

The output unit 290 displays, in addition to the reference time period determined by the calculation unit 260, a prompt asking whether to consent to the reference time period being written to the storage unit 270 (Step S8). The operator of the air conditioning system 1 enters, through the operation unit 280, information as to whether to consent to the displayed reference time period being written to the storage unit 270.

When information indicating that the operator consents to the reference time period being written to the storage unit 270 is entered through the operation unit 280, the processing proceeds to Step S9, where the reference time period determined by the calculation unit 260 is written to the storage unit 270 and is saved as the reference time period for the start instruction C. That is, the calculation unit 260 prompts, in Step S9, the storage unit 270 to store the reference time period determined by calculation. When information indicating that the operator does not consent to the reference time period being written to the storage unit 270 is entered through the operation unit 280, the processing proceeds to Step S10, where the reference-time-period calculation and setting processing is stopped, with the reference time period determined by the calculation unit 260 not being written to the storage unit 270.

Step S8 enables the operator of the air conditioning system 1 to eliminate or reduce the possibility that the storage unit 270 will store an obviously wrong value as the reference time period. Following the stoppage of the reference-time-period calculation and setting processing in Step S10, inspection and repair of, for example, the air conditioning apparatus 10 may be conducted. After that, the reference-time-period calculation and setting processing is to be executed afresh.

(4) Operation of Management System in Normal Mode

The following describes operation of the management system 100 in an instance where an operation (a transmission request operation) is performed on the operation unit 280 to make a request that the instruction transmission unit 210 transmit the start instruction C to the controller 55 of the chiller unit 50, with the reference time period being already stored in the storage unit 270 (as in Step S11 in FIG. 3); that is, in an instance where the operating mode of the management system 100 is set to the normal mode. The management system 100 works in a similar manner in instances where other instructions (e.g., instructions to devices other than the chiller unit 50 in the air conditioning apparatus 10 and instructions to the chiller unit 50 other than the start instruction C) are received by the operation unit 280, and such instances will not be further elaborated here.

When the operating mode of the management system 100 is set to the normal mode, the instruction transmission unit 210 transmits, as in Step S4, the start instruction C to the controller 55 (Step S20).

In Step S21, it is determined whether the response R, which indicates that a state transition is made in accordance with the start instruction C transmitted in Step S20, is received by the response reception unit 220. Step S21 is executed before the reference time period associated with the start instruction C and stored in the storage unit 270 elapses from the transmission of the start instruction C. When the processing returns to Step S22, which will be described later, to Step S21 (the determination in Step S21 is repeatedly conducted), the determination in Step S21 is preferably conducted at time intervals that are sufficiently short with respect to the reference time period associated with the start instruction C.

When it is determined in Step S21 that the response R is received by the response reception unit 220, the processing proceeds to Step S30. The response R is received by the response reception unit 220 within the reference time period after transmission of the start instruction C by the instruction transmission unit 210. The detection unit 240 thus determines that the present state is normal.

When it is determined in Step S21 that the response R is not received by the response reception unit 220, the processing proceeds to Step S22. In Step S22, it is determined whether the reference time period (stored in the storage unit 270 and associated with the start instruction C) has elapsed since the instruction transmission unit 210 transmitted the start instruction C. When it is determined that the reference time period has elapsed, the processing proceeds to Step S23. When it is determined that the reference time period has not elapsed, the processing returns to Step S21.

In Step S23, in which the response R is not received by the response reception unit 220 within the reference time period associated with the start instruction C after transmission of the start instruction C by the instruction transmission unit 210, the detection unit 240 determines that the present state is abnormal. That is, the detection unit 240 detects an abnormal condition in Step S23.

Subsequently, the output unit 290, which is an example of an indication unit, indicates (displays) in Step S24 that an abnormal condition is detected by the detection unit 240.

When the detection unit 240 determines that the present state is abnormal, the management system 100 may, for example, stop the operation of the air conditioning apparatus 10. Alternatively, the air conditioning apparatus 10 may be kept in operation and may remain unaffected by the determination that the present state is abnormal; nevertheless, the occurrence of abnormality is indicated.

(5) Features 5-1

The management system 100 in the present embodiment is the management system 100 for the air conditioning apparatus 10. The air conditioning apparatus 10 is an example of a refrigeration apparatus. The refrigeration apparatus is an example of building equipment. The management apparatus 200 of the management system 100 includes the instruction transmission unit 210, the response reception unit 220, the detection unit 240, the storage unit 270, the time measurement unit 230, the mode setting unit 250, and the calculation unit 260. The instruction transmission unit 210 transmits an instruction to a device or at least one of a plurality of devices included in the air conditioning apparatus 10. The air conditioning apparatus 10 includes devices such as: the chiller unit 50 including the compressor 52; the cooling tower 70; the circulating pump 42; the flow regulating valves 44; the cooling water pump 62; the air handling units 20; and fan coil units. The response reception unit 220 receives a response indicating that a state transition is made by the device or one of the plurality of devices in the air conditioning apparatus 10 in accordance with the instruction. The detection unit 240 detects an abnormal condition. The abnormal condition herein refers to the state in which the response is not received by the response reception unit 220 within the reference time period after transmission of the instruction by the instruction transmission unit 210. The storage unit 270 stores a reference time period. The time measurement unit 230 measures the length of time from when the instruction transmission unit 210 transmits the instruction to when the response reception unit 220 receives the response. The mode setting unit 250 sets the operating mode of the management system 100 to the reference-time-period calculation mode, in which calculations are performed to determine the reference time period. In the reference-time-period calculation mode, the calculation unit 260 performs calculations to determine the reference time period based on the measurement result obtained by the time measurement unit 230 and prompts the storage unit 270 to store the determined reference time period.

The management system 100 is configured in such a manner that the reference time period for use in detecting abnormal conditions in the air conditioning apparatus 10 is determined based on the result of the actual measurement of the time interval between transmission of an instruction and reception of a response. This feature eliminates or reduces the possibility that any normal time lag between transmission of an instruction and the reception of a response will be erroneously taken as an abnormal condition in which there is something wrong with the air conditioning apparatus 10. Furthermore, such an abnormal condition may be detected without too much delay.

The management system 100 is configured in such a manner that the calculation unit 260 automatically performs calculations to determine the reference time period. This feature saves time needed by workers involved in setting reference time periods and enables a reduction in man hours associated with, for example, trial runs.

5-2

The management system 100 in the present embodiment is configured in such a manner that the mode setting unit 250 sets the operating mode to the reference-time-period calculation mode when the air conditioning apparatus 10 is in a predetermined state.

When the air conditioning apparatus 10 is in the predetermined state; that is, with the state of the air conditioning apparatus 10 outside the management system 100 serving as a trigger, the reference time period may be determined by calculation based on the result of the actual measurement of the time interval between transmission of an instruction and reception of a response.

5-3

The management system 100 in the present embodiment regards, as the predetermined state, the following states: the state in which the air conditioning apparatus 10 is newly installed; the state in which another device is additionally installed on the air conditioning apparatus 10; the state in which at least one of the devices in the air conditioning apparatus 10 is renewed; and the state in which one or more devices are removed from the air conditioning apparatus 10.

In the above cases in which newly determination by calculation or updated of the reference time period is preferable, calculations can be performed to determine the reference time period.

5-4

The management system 100 in the present embodiment is configured in such a manner that the mode setting unit 250 sets the operating mode to the reference-time-period calculation mode when a reference time period of interest is not stored in the storage unit 270.

In the absence of needed reference time periods (e.g., when the air conditioning apparatus 10 is given the first trial run after installment), calculations may be automatically performed to determine the reference time periods without omission.

5-5

The management system 100 in the present embodiment includes the operation unit 280, which is an example of a request receiving unit. The operation unit 280 receives a mode setting request that requests that the mode setting unit 250 to set the operating mode to the reference-time-period calculation mode. The mode setting unit 250 sets the operating mode to the reference-time-period calculation mode in response to the mode setting request.

The operating mode of the management system 100 may be easily switched to the reference-time-period calculation mode, where calculations may be performed to determine the reference time period as the need arises.

5-6

The management system 100 in the present embodiment includes the output unit 290, which is an example of an indication unit. The output unit 290 provides an indication when an abnormal condition is detected by the detection unit 240.

This feature enables the operator of the air conditioning apparatus 10 to easily ascertain the occurrence of an abnormal condition.

5-7

The management system 100 in the present embodiment is configured in such a manner that the calculation unit 260 determines the reference time period by adding an allowance time to the length of time measured by the time measurement unit 230.

This feature eliminates or reduces the possibility that a typical level of delay that may be experienced in the reception of a response will be erroneously taken as abnormality in the air conditioning apparatus 10 due to the use of an excessively short reference time period.

5-8

As an example of a refrigeration apparatus provided as building equipment, the conditioning apparatus 10 supported by the management system 100 in the present embodiment includes devices such as the compressor 52, the cooling tower 70, the circulating pump 42, the cooling water pump 62, and the air handling units 20.

Even when the air conditioning apparatus 10 includes the devices 20, 42, 52, 62, and 70 that take time to stabilize the output, the reference time period that enables the accurate detection of the abnormal conditions in the air conditioning apparatus 10 may be determined by calculation based on the result of the actual measurement of the time interval between transmission of the instruction and reception of the response.

(6) Modifications

The following describes modifications of the present embodiment. These modifications may be employed in combination as appropriate, to the extent not inconsistent with each other.

(6-1) Modification A

Although the management system 100 in the embodiment above includes mainly the management apparatus 200, the configuration of the management system 100 is not limited to the configuration in this embodiment.

Instead of including only the management apparatus 200, the management system 100 may include: a data analyzer that has functions similar to the functions of the time measurement unit 230 in the embodiment above; and a management system that has functions other than the functions of the time measurement unit 230 and is otherwise similar to the management apparatus 200 in the embodiment above. Alternatively, the management system 100 may include three or more devices and may function, as a whole, in a manner similar to the management apparatus 200 in the embodiment above.

Instead of including only the management apparatus 200, the management system 100 may include: a management system that performs part of the functions of the management apparatus 200 such as functions other than the functions of the calculation unit 260 and is otherwise similar to the management apparatus 200 in the embodiment above; and a server that is configured to be capable of communicating with the management apparatus 200 and has functions similar to the functions of the calculation unit 260.

(6-2) Modification B

In the embodiment above, the air conditioning apparatus 10 transmits a response indicating that a state transition is made by a device in the air conditioning apparatus 10 in accordance with the relevant instruction. Alternatively, a device (e.g., a sensor) independent of the air conditional apparatus 10 may transmit a response indicating that a state transition is made by a device in the air conditioning apparatus 10 in accordance with the relevant instruction.

(6-3) Modification C

In the embodiment above, the operation unit 280 functions as the request receiving unit that receives a mode setting request. Alternatively, the request receiving unit may be, for example, a reception unit that receives various operations (signals) from a mobile communication terminal.

In the embodiment above, a display provided as the output unit 290 indicates various pieces of information; that is, the display may, for example, indicate that an abnormal condition is detected by the detection unit 240. The output unit 290 is merely an example of the indication unit. For example, the indication unit may be, for example, a transmission unit that provides various pieces of information to a mobile communication terminal.

(6-4) Modification D

The embodiment above describes the management system according to the present disclosure by citing, as an example, the management system 100 for the refrigeration apparatus, or more specifically, the air conditioning apparatus provided as an example of building equipment. The building equipment to be managed by the management system is not limited to refrigeration apparatuses.

For example, the building equipment may include, in addition to the refrigeration apparatus or in place of the refrigeration apparatus, at least one of the following types of equipment installable on a building: ventilation equipment, lighting equipment, disaster prevention equipment, sanitary equipment (e.g., water supply equipment, drainage equipment, and sewage treatment equipment), and equipment such as an elevator or an escalator. Communications between the management system 100 and the building equipment including the refrigeration apparatus are established by using a communications protocol such as BACnet (registered trademark) or MODBUS (registered trademark). When the building equipment concerned is ventilation equipment, the management system 100 transmits, to a ventilation device included in the ventilation equipment, an instruction to run or to stop running, and in turn, the ventilation equipment transmits a response signal indicating that a state transition is made by the ventilation device in accordance with the instruction to run or to stop running. When the building equipment concerned is lighting equipment, the management system 100 transmits, to an illumination device included in the lighting equipment, an instruction to light up or to go out, and in turn, the lighting equipment transmits a response signal indicating that a state transition is made by the illumination device in accordance with the instruction to light up or to go out. When the building equipment concerned is disaster prevention equipment, the management system 100 transmits an activation instruction to a disaster prevention device (e.g., a fire shutter or a sprinkler) included in the disaster prevention equipment, and in turn, the disaster prevention equipment transmits a response signal indicating that a state transition is made by the disaster prevention device in accordance with the activation instruction. When the building equipment concerned is sanitary equipment, the management system 100 transmits, to a device (e.g., a feed-water pump) included in the sanitary equipment, an instruction to run or to stop running, and in turn, the sanitary equipment transmits a response signal indicating that a state transition is made by the device in accordance with the instruction to run or to stop running. When the building equipment concerned is an elevator or an escalator, the management system 100 transmits, to the elevator or the escalator, an instruction to run or to stop running, and in turn, the elevator or the escalator transmits a response signal indicating that a state transition is made by the elevator or the escalator in accordance with the instruction to run or to stop running.

The building equipment concerned may include, in addition to part or the entirety of the equipment mentioned above or in place of part or the entirety of the equipment mentioned above, network equipment, an external storage, or both, which are installable on a building. The network equipment includes devices such as a router, a hub, and a modem. The external storage includes devices such as a USB memory and a CF card. The network equipment or the external storage may be managed by the management system 100. In this case, the management system 100 transmits an ON or OFF instruction to each of the devices included in the network equipment or in the external storage, and in turn, the network equipment or the external storage transmits a response signal indicating that a state transition is made by the relevant device in accordance with the ON or OFF instruction.

The building equipment concerned may include, in addition to part or the entirety of the equipment mentioned above or in place of part or the entirety of the equipment mentioned above, control equipment installable on a building. The control equipment includes a control device such as a programmable logic controller (PLC) that is capable of controlling various apparatuses (e.g., a belt conveyor). The control equipment may be managed by the management system 100. In this case, the management system 100 transmits, to a control device such as the PLC that controls various apparatuses, an instruction such as an ON or OFF instruction for an apparatus of interest, and in turn, the control equipment transmits a response signal indicating that the device has entered a predetermined state (a response signal indicating that the control device has caused the relevant apparatus under control to make a state transition in accordance with the ON or OFF instruction).

The building equipment concerned may include, in addition to part or the entirety of the equipment mentioned above or in place of part or the entirety of the equipment mentioned above, equipment including devices such as contact input and output for controlling various apparatuses (e.g., pumps) installable on a building. The equipment may be managed by the management system 100. In this case, the management system 100 transmits an instruction such as an ON or OFF instruction to the contact input that receives inputs to an apparatus of interest, and in turn, the contact output transmits a response signal indicating that the device has entered a predetermined state (a response signal indicating that the device has caused the relevant apparatus under control to make a state transition in accordance with the ON or OFF instruction).

The setups according to the embodiment above are also applicable to these types of building equipment, where the reference time period for use in detecting abnormal conditions is thus determined based on the result of the actual measurement of the time interval between transmission of an instruction and reception of a response, and in turn, abnormal conditions in the relevant building equipment may be accurately detected.

It is not always the case that one type of building equipment is managed by the management system 100. More than one type of building equipment may be managed by the management system 100.

(6-5) Modification E

Although the refrigeration apparatus to be managed by the management system 100 in the embodiment above is a vapor compression refrigeration apparatus, the refrigeration apparatus is not limited the vapor compression refrigeration apparatus. The refrigeration apparatus to be managed by the management system 100 may be an absorption refrigeration apparatus.

(6-6) Modification F

In the embodiment above, the state in which the air conditioning apparatus 10 is newly installed is ascertained based on the fact that no reference time period is stored in the storage unit 270. When it is determined that no reference time period is stored in the storage unit 270, the operating mode of the management system 100 is set to the reference-time-period calculation mode. The procedure by which the operating mode of the management system 100 is set to the reference-time-period calculation mode when the air conditioning apparatus 10 is newly installed is not limited to the procedure in the embodiment above. The management apparatus 200 of the management system 100 may be configured as follows: the state in which a flag indicative of the first run is set may be regarded as the state in which the air conditioning apparatus 10 is newly installed, and the mode setting unit 250 may in turn set the operating mode of the management system 100 to the reference-time-period calculation mode.

(6-7) Modification G

Although the refrigeration apparatus to be managed by the management system 100 in the embodiment above is an air conditioning apparatus, the refrigeration to be apparatus to be managed by the management system is not limited the air conditioning apparatus. The apparatus to be managed by the management system 100 may be a cooling apparatus that cools various types of equipment by causing cold water to circulate through the heat medium circuit 40 or may be a hot-water supply apparatus or a floor heating apparatus that heats water by causing warm water to circulate through the heat medium circuit 40.

(6-8) Modification H

In the embodiment above, the mode setting unit 250 sets the operating mode of the management system 100 to the reference-time-period calculation mode principally when the building equipment to be managed (the air conditioning apparatus 10) is newly installed or when a device included in the building equipment to be managed undergoes a change. However, it is not always the case.

For example, the mode setting unit 250 may set the operating mode of the management system 100 to the reference-time-period calculation mode when a networking member 82 or at least one of a plurality of networking members 82 (see FIG. 2) is renewed. The networking member 82 or the plurality of networking members 82 communicably connect the management system 100 and the building equipment (e.g., the air conditioning apparatus 10) to each other in such a manner as to enable the instruction transmission unit 210 to transmit instructions to devices included in the building equipment and to enable the response reception unit 220 to receive responses. The networking member 82 or at least one of the plurality of networking members 82 may be a network device such as a router, a hub, or a modem or may be a network cable.

For example, the mode setting unit 250 sets the operating mode of the management system 100 to the reference-time-period calculation mode when a network device on the network is detected for the first time. Alternatively, the mode setting unit 250 may set the operating mode of the management system 100 to the reference-time-period calculation mode when an input indicative of the changing of the networking member 82 is received by the operation unit 280.

With no particular change in the building equipment, the reference time period is newly determined by calculation when the networking member 82 is renewed in such a way as to possibly change the time interval between transmission of the instruction and reception of the response, and in turn, abnormal conditions in the relevant building equipment may be accurately detected.

Second Embodiment

The following describes a management system according to a second embodiment.

The major difference between the management system 100 according to the first embodiment and the management system according to the second embodiment is as follows.

In the management system 100 according to the first embodiment, calculations are performed to determine the reference time period principally when the building equipment to be managed is newly installed or when a device included in the building equipment to be managed undergoes a change. In the management system according to the second embodiment, meanwhile, calculations are performed to determine the reference time period in these instances, and updating of the reference time period is additionally performed at predetermined timings. In the second embodiment, the management system, which involves such an additional processing, is otherwise similar to the management system 100 in the first embodiment. Thus, each constituent component of the management system 100 according to the second embodiment and the corresponding one of the constituent components of the management system 100 according to the first embodiment are hereinafter denoted by the same reference sign.

The following description will be given assuming that the management system 100 for the building equipment in the second embodiment is a system that manages the air conditioning apparatus 10, which is an example of building equipment, as in the first embodiment. As with the air conditioning apparatus 10, each constituent component of the air conditioning apparatus 10 in the second embodiment and the corresponding one of the constituent components of the air conditioning apparatus 10 in the first embodiment are hereinafter denoted by the same reference sign.

The second embodiment will be described below with a focus on the difference between the first and second embodiments, or more specifically, the updating of the reference time period in the management system 100, and the features common to the management system 100 according to the first embodiment and the management system 100 according to the second embodiment will not be further elaborated here.

(1) Recalculation and Updating of Reference Time Period

Figure 5:
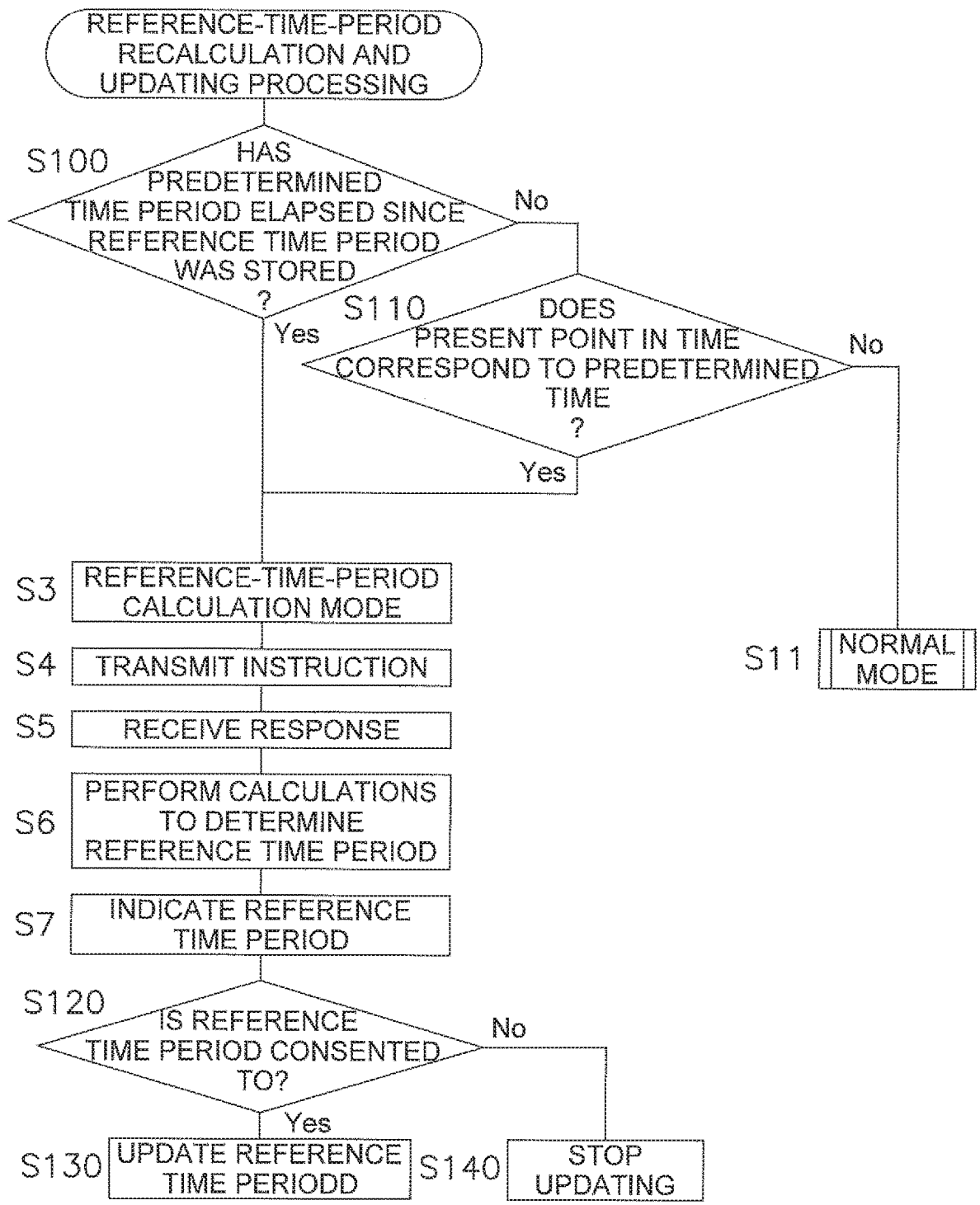
FIG. 5 is a flowchart for describing an example of reference-time-period recalculation and updating processing executed by a management system according to a second embodiment.

With reference to the flowchart in FIG. 5, the following describes reference-time-period calculation and setting processing executed by the management system 100 according to the second embodiment. The following takes, as an example, recalculation and updating of the reference time period (hereinafter referred to as a reference time period T for simplicity) corresponding to the time interval between transmission of the start instruction C, which is an instruction to actuate the chiller unit 50 of the air conditioning apparatus 10, and reception of the response R.

The reference-time-period recalculation and updating processing in the flowchart in FIG. 5 is executed, for example, once a day, or more specifically, when the transmission request operation made to request the transmission of the start instruction C, which is an instruction to start the operation of the chiller unit 50 of the air conditioning apparatus 10, is received by the operation unit 280 for the first time each day.

In Step S100, it is determined whether a predetermined time period has elapsed since the reference time period T was most recently stored in the storage unit 270, that is, since the calculation unit 260 most recently performed calculations to determine the reference time period T. The predetermined time period is preferably a time period over which age deterioration of devices and components constituting the chiller unit 50 can possibly lead to changing of the time interval between transmission of the start instruction C and reception of the response R. The age deterioration of the devices and components may herein mean that the devices and components are still serviceable but do not work as well as they did at the beginning of use. When it is determined that the predetermined time period has elapsed since the reference time period was most recently stored in the storage unit 270, the processing proceeds to Step S3. When it is determined that the predetermined time period has not elapsed since the reference time period was most recently stored in the storage unit 270, the processing proceeds to Step S110.

Figure 4:
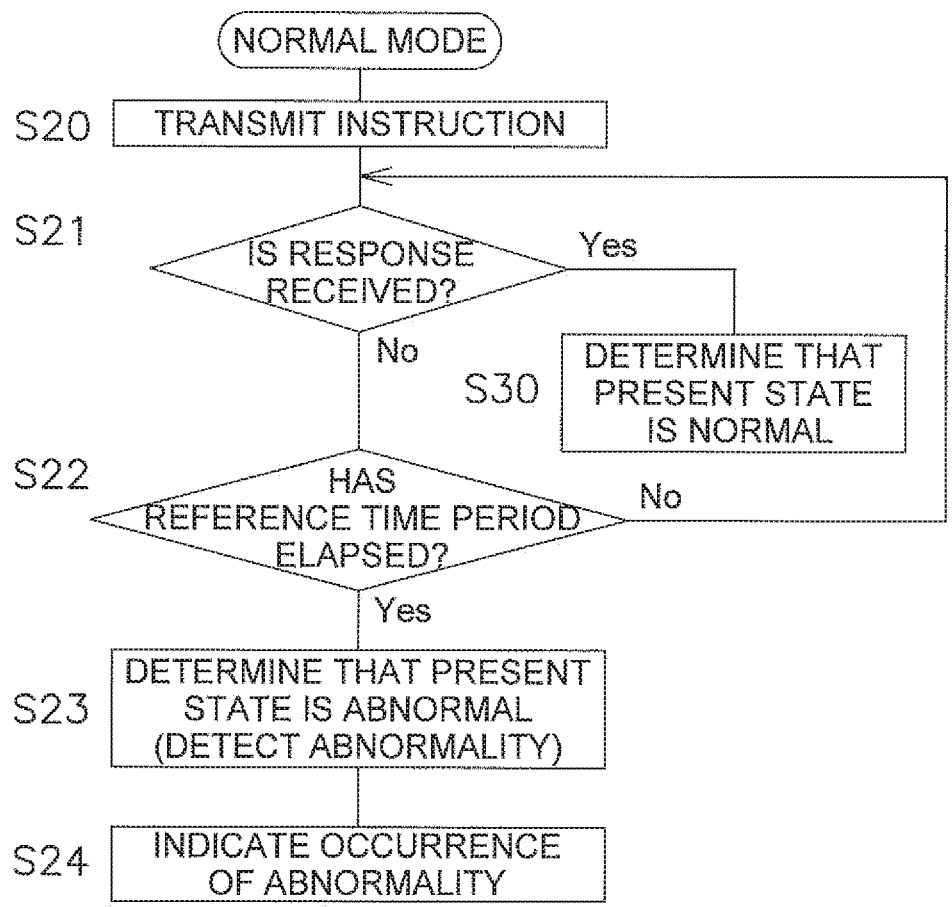
FIG. 4 is a flowchart for describing a normal mode of the management system illustrated in FIG. 1.

In Step S110, it is determined whether the present point in time corresponds to the predetermined time. The instances where the present point in time corresponds to the predetermined time include such an instance where the date of interest is a specific date fixed in advance or such an instance where the day of interest is a particular day early in the month. The predetermined time may be a given date and/or time or may be a recurring date and/or time determined in accordance with certain rules. When it is determined that the present point in time corresponds to the predetermined time, the processing proceeds to Step S3. When it is determined that the present point in time does not correspond to the predetermined time, the processing proceeds to Step S11. Step S11 will be followed by the processing described in the first embodiment with reference to FIG. 4, which will not be further elaborated here.

In Step S3, the mode setting unit 250 sets the operating mode of the management system 100 to the reference-time-period calculation mode, and the processing then proceeds to Step S4. Steps S4 to S7 are identical to Steps S4 to S7 described in the first embodiment with reference to the flowchart in FIG. 3 and will not be further elaborated here.

In Step S120, the output unit 290 displays a prompt asking whether to consent to the reference time period T, which is determined through recalculations performed by the calculation unit 260 and is displayed on the output unit 290, being written to the storage unit 270. In Step S7, the output unit 290 may display, for comparison, the reference time period T currently stored in the storage unit 270 together with the newly determined reference time period T. The operator of the air conditioning system 1 enters, through the operation unit 280, information as to whether to consent that displayed newly calculated reference time period T is written to the storage unit 270.

When information indicating that the operator consents to the reference time period T being written to (updated in) the storage unit 270 is entered through the operation unit 280, the processing proceeds to Step S130, where the calculation unit 260 prompts the storage unit 270 to store the determined reference time period T. The reference time period T newly stored in the storage unit 270 is used for detection of abnormal conditions until the next updating of the reference time period T. This setup offers an advantage in such a case where the time interval between transmission of an instruction and reception of a response may vary over time due to, for example, age deterioration of the devices constituting the air conditioning apparatus 10, which is an example of building equipment. With effects of the age deterioration being suppressed owing to calculations performed to newly determine the reference time period T, abnormal conditions in the air conditioning apparatus 10 may be accurately detected.

When information indicating that the operator does not consent to the reference time period being written to the storage unit 270 is entered through the operation unit 280, the processing proceeds to Step S140, where the updating of the reference time period T is stopped, with the reference time period T determined by the calculation unit 260 not being written to the storage unit 270. Step S120 enables the operator of the air conditioning system 1 to eliminate or reduce the possibility that the storage unit 270 will store, as the reference time period T, an obviously wrong reference time period T or an overlong reference time period T.

When the updating of the reference time period T is stopped in Step S140, the reference time period T already stored in the storage unit 270 will be used, as it is, for detection of abnormal conditions and will continue to serve as the reference time period corresponding to the time interval between transmission of the start instruction C, which is an instruction to start the operation of the chiller unit 50, and reception of the response R. The value of the reference time period T determined by the calculation unit 260 in Step S6 may be used by the operator of the air conditioning system 1 as an index for determining when to subject the devices to, for example, renewal or maintenance.

(2) Modifications

In the management system 100 according to the second embodiment, calculations are performed to determine the reference time period when the building equipment to be managed is newly installed or when a device included in the building equipment to be managed undergoes a change. Furthermore, recalculations and updating of the reference time period are performed when the predetermined time period has elapsed since the reference time period was stored in the storage unit 270. Recalculations and updating of the reference time period are also performed at the predetermined time.

Alternatively, the management system 100 may be configured as follows. When the building equipment to be managed is newly installed or when a device included in the building equipment to be managed undergoes a change, a default value is used as the reference time period (no calculation is performed); thereafter, another reference time period is determined by calculation and is then stored. Still alternatively, recalculations and updating of the reference time period may be performed in the management system 100 in either one of the following timings: when the predetermined time period has elapsed since the reference time period was stored in the storage unit 270; and at the predetermined time.

The modifications of the first embodiment may be applied, as appropriate, to the second embodiment.

While the embodiments of the present disclosure and modifications thereof have been described herein above, it is to be appreciated that various changes in form and detail may be made without departing from the spirit and scope of the present disclosure presently or hereafter claimed.

The present disclosure is useful in terms of being widely applicable to management systems for building equipment.

What is claimed is:

1. A management system for building equipment, comprising:
  a processor; and
  a memory configured to store a reference time period,
  the processor being configured to
    transmit an instruction to a device or at least one of a plurality of devices included in the building equipment;
    receive a response indicating that a state transition is made by the device or the at least one of the plurality of devices in accordance with the instruction,
    measure a length of time from when the instruction is transmitted to when the response is received,
    detect an abnormal condition in which the response is not received within a reference time period after transmission of the instruction, and
    set an operating mode of the management system to a reference-time-period calculation mode in which the reference time period is calculated based on a measurement result of the length of time from when the instruction is transmitted to when the response is received and is stored in in the memory, and
    set the operating mode of the management system to the reference-time-period calculation mode at a predetermined timing to recalculate the reference time period based on the measurement result of the length of time from when the instruction is transmitted to when the response is received and update the reference time period in the memory with a recalculated reference time period.

2. The management system according to claim 1, wherein the processor is further configured to set the operating mode to the reference-time-period calculation mode when the building equipment is in a predetermined state.

3. The management system according to claim 2, wherein the predetermined state includes at least one of
   a state in which the building equipment is newly installed,
   a state in which another device is additionally installed on the building equipment,
   a state in which the device or at least one of the plurality of devices included in the building equipment is renewed, and
   a state in which the device or one or more of the plurality of devices are removed from the building equipment.

4. The management system according to claim 1, wherein the processor is further configured to set the operating mode to the reference-time-period calculation mode when the reference time period is not stored in the memory.

5. The management system according to claim 1, wherein the processor is configured to set the operating mode to the reference-time-period calculation mode at the predetermined timing the predetermined timing being determined when one or both of
   a predetermined time period has elapsed from storing of the reference time period in the memory and
   at a predetermined time.

6. The management system according to claim 1, further comprising:
   one or a plurality of networking members configured to communicably connect the management system and the building equipment to each other in such a manner so as
      to transmit the instruction to the device or at least one of the plurality of devices included in the building equipment and
      to receive the response,
   the processor being further configured to set the operating mode to the reference-time-period calculation mode when the networking member or at least one of the plurality of networking members is renewed.

7. The management system according to 1, wherein the processor is further configured to
   receive a mode setting request that requests setting the operating mode to the reference-time-period calculation mode, and
   set the operating mode to the reference-time-period calculation mode in response to the mode setting request.

8. The management system according to claim 1, wherein the processor is configured to provide an indication when the abnormal condition is detected.

9. The management system according to claim 1, wherein the processor is further configured to determine the reference time period by adding an allowance time to the length of time from when the instruction is transmitted to when the response is received.

10. The management system according to claim 1, wherein
   the building equipment includes a refrigeration apparatus, and
   the refrigeration apparatus includes at least one of a compressor, a cooling tower, a pump, an air handling unit, and a fan coil unit as the device or at least one of the plurality of devices.

11. The management system according to claim 2, wherein
   the processor is, configured to provide an indication when the abnormal condition is detected.

12. The management system according to claim 2, wherein
   the processor is further configured to determine the reference time period by adding an allowance time to the length of time measured from when the instruction is transmitted to when the response is received.

13. The management system according to claim 4, wherein
   the processor is configured to provide an indication when the abnormal condition is detected.

14. The management system according to claim 4, wherein
   the processor is further configured to determine the reference time period by adding an allowance time to the length of time measured from when the instruction is transmitted to when the response is received.

15. The management system according to claim 5, wherein
   the processor is configured to provide an indication when the abnormal condition is detected.

16. The management system according to claim 5, wherein
   the processor is further configured to determine the reference time period by adding an allowance time to the length of time from when the instruction is transmitted to when the response is received.

17. The management system according to claim 6, wherein
   the processor is configured to provide an indication when the abnormal condition is detected.

18. The management system according to claim 6, wherein
   the processor is further configured to determine the reference time period by adding an allowance time to the length of time from when the instruction is transmitted to when the response is received.

19. The management system according to claim 7, wherein
   the processor is configured to provide an indication when the abnormal condition is detected.

20. The management system according to claim 7, wherein
   the processor is further configured to determine the reference time period by adding an allowance time to the length of time from when the instruction is transmitted to when the response is received.

* * * * *